(12) United States Patent
    Church

(10) Patent No.: US 8,967,087 B2
(45) Date of Patent: Mar. 3, 2015

(54) ANIMAL LEASH

(71) Applicant: John D. Church, Garden City, GA (US)

(72) Inventor: John D. Church, Garden City, GA (US)

(*) Notice: Subject to any disclaimer, the term of this patent is extended or adjusted under 35 U.S.C. 154(b) by 44 days.

(21) Appl. No.: 13/745,146

(22) Filed: Jan. 18, 2013

(65) Prior Publication Data

US 2013/0133592 A1    May 30, 2013

Related U.S. Application Data

(63) Continuation-in-part of application No. 13/687,362, filed on Nov. 28, 2012.

(60) Provisional application No. 61/633,364, filed on Feb. 9, 2012, provisional application No. 61/629,822, filed on Nov. 29, 2011, provisional application No. 61/632,720, filed on Jan. 30, 2012, provisional application No. 61/633,230, filed on Feb. 7, 2012, provisional application No. 61/631,996, filed on Jan. 17, 2012.

(51) Int. Cl.
    A01K 27/00    (2006.01)

(52) U.S. Cl.
    CPC ..................... A01K 27/003 (2013.01)
    USPC ......................................................... 119/799

(58) Field of Classification Search
    USPC ........... 119/792, 795, 797, 798, 799; 135/166
    See application file for complete search history.

(56) References Cited

U.S. PATENT DOCUMENTS

| | | | |
|---|---|---|---|
| 3,760,532 A * | 9/1973 | Campion | 446/289 |
| 4,763,609 A | 8/1988 | Kulik | |
| 5,291,856 A | 3/1994 | Goller | |
| 5,361,726 A | 11/1994 | Harris et al. | |
| 5,435,273 A | 7/1995 | Landis et al. | |
| 5,462,019 A | 10/1995 | Hong-Rong et al. | |
| 5,732,662 A | 3/1998 | Jacobsen | |
| 5,813,368 A * | 9/1998 | Rasmussen | 119/799 |
| 6,053,129 A | 4/2000 | Akre | |
| 6,223,694 B1 | 5/2001 | Rubin | |
| 6,612,264 B2 | 9/2003 | Levine | |
| 7,168,394 B2 * | 1/2007 | Berry | 119/863 |
| 7,293,531 B2 * | 11/2007 | Young, III | 119/798 |
| 7,389,750 B1 * | 6/2008 | Rogers et al. | 119/792 |
| 7,530,334 B1 * | 5/2009 | Napolitano | 119/798 |
| 8,176,878 B1 * | 5/2012 | Wexler | 119/801 |
| 2002/0040690 A1 * | 4/2002 | Ganz | 119/792 |
| 2007/0119386 A1 * | 5/2007 | Kung | 119/798 |
| 2007/0175408 A1 * | 8/2007 | Spencer | 119/798 |
| 2010/0024742 A1 * | 2/2010 | Honeycutt et al. | 119/795 |
| 2011/0000440 A1 * | 1/2011 | Mucerino et al. | 119/709 |
| 2011/0214620 A1 * | 9/2011 | Johnson | 119/792 |

* cited by examiner

*Primary Examiner* — Rob Swiatek
*Assistant Examiner* — George Andonyan
(74) *Attorney, Agent, or Firm* — Venable LLP; Michele V. Frank

(57) ABSTRACT

An animal leash such as, for example, for dogs, may include an elongated flexible sleeve having a proximal end and a distal end. The proximal end of the sleeve is configured to be held by a hand of a user and includes an opening for accessing an interior pocket of the sleeve. A rigid rod may be removably received within the interior pocket of the flexible sleeve through the opening to optionally make the animal leash rigid for training and/or controlling an animal (e.g., a dog) releasably attached to the leash. An attachment portion may be coupled at or near the distal end of the sleeve and may be configured to be releasably attached to a collar or harness on the animal.

13 Claims, 12 Drawing Sheets

ANIMAL LEASH

CROSS-REFERENCE TO RELATED APPLICATIONS

This application claims the priority benefit under 35 U.S.C. §119(e) of U.S. Provisional Patent Application No. 61/633,364, filed Feb. 9, 2012, the entirety of which is hereby incorporated by reference. This application is a continuation-in-part application of Ser. No. 13/687,362, filed Nov. 28, 2011, which claims the priority benefit under 35 U.S.C. §119(e) of the following U.S. provisional patent applications: U.S. Provisional Patent Application No. 61/629,822, filed Nov. 29, 2011, U.S. Provisional Patent Application No. 61/631,996, filed Jan. 17, 2012, U.S. Provisional Patent Application No. 61/632,720, filed Jan. 30, 2012, and U.S. Provisional Patent Application No. 61/633,230, filed Feb. 7, 2012. Each of the foregoing applications is hereby incorporated by reference in its entirety.

BACKGROUND

1. Field of Invention

The invention relates generally to an animal leash and, more particularly, to an animal leash that is optionally rigid and flexible for training and/or controlling an animal (e.g., a dog) releasably attached thereto.

2. Related Art

According to the American Pet Products Association 2011-2012 National Pet Owners Survey, there are approximately 78.2 million owned dogs in the United States. Thirty-nine percent of U.S. households own at least one dog. Millions of dog owners train and exercise their dogs every day by walking their dogs on a leash. Known leashes typically include a flexible fabric, rope, cable, chain or the like arranged to be held in the owner's hand or hands at one end and connect to a collar or harness on the dog at the other end. Use of such flexible fabric, rope, cable, or chain alone, however, allows only limited control of the animal by pulling.

SUMMARY

What is needed is a device that optionally provides three-dimensional control over the animal when walking and/or training the animal.

In accordance with an embodiment of the invention, an animal leash is provided. The animal leash such as, for example, for dogs, may include an elongated flexible sleeve having a proximal end and a distal end. The proximal end of the sleeve is configured to be held by a hand of a user and includes an opening for accessing an interior pocket of the sleeve. A rigid rod may be removably received within the interior pocket of the flexible sleeve through the opening to optionally make the animal leash rigid for training and/or controlling an animal (e.g., a dog) releasably attached thereto. An attachment portion may be coupled at or near the distal end of the sleeve and may be configured to be releasably attached to a collar or harness on the animal.

In accordance with an illustrative aspect of the invention, the opening of the sleeve is optionally closable. The opening of the sleeve may include, for example, a closing element such as, for example, but not limited to, a hook-and-loop fastening element, a snap element, a button element, a magnetic element, and an adhesive element.

In accordance with an embodiment of the invention, an animal leash is provided. The animal leash (e.g., for dogs) may include a handle portion, a rigid rod, and an attachment portion. The handle portion may be configured to be held by a hand of a user. The rigid rod may extend along a longitudinal axis and may have a proximal end and a distal end. The proximal end may be rigidly connected to the handle portion. An attachment portion may be coupled at or near the distal end of the rigid rod and configured to be removably attached to a collar or harness on the animal.

In accordance with an illustrative aspect of the invention, the attachment portion may be rotatably coupled to the distal end of the rigid rod.

In accordance with another illustrative aspect of the invention, the attachment portion may include an eye bolt rotatably coupled to the distal end of the rigid rod. The attachment portion may include a leash clip coupled to the eye bolt. The attachment portion may further include an intermediate connector coupled between the eye bolt and the leash clip. An end cap may be fixedly connected to the distal end of the rigid rod, wherein the eye bolt is rotatably coupled to the cap.

In accordance with another illustrative aspect of the invention, the handle portion and the rigid rod may be integrally formed from a rigid tubular member. The handle portion may include a section bent relative to the longitudinal axis of the rigid rod.

In accordance with another illustrative aspect of the invention, a safety tether may be connected to an end of the handle and configured to be worn around a wrist of the user during use. The safety tether may be connected to the end of the handle by an eye bolt. The eye bolt may be rotatably coupled to the end of the handle. An end cap may be fixedly connected to the end of the handle and the eye bolt may be rotatably coupled to the end cap.

In accordance with another illustrative aspect of the invention, the rigid rod may be extendable.

In accordance with another illustrative aspect of the invention, a length of the rigid rod may be between approximately 20 and 60 inches. For example, the length of the rigid rod may be between approximately 40 and 55 inches.

In accordance with another illustrative aspect of the invention, the rigid rod and the handle may be integrally formed from plastic or metal tubing. The plastic tubing may be, for example, polyvinylchloride. The metal tubing may be, for example, aluminum.

In accordance with another illustrative aspect of the invention, an extension assembly may be configured to be removably coupled to the attachment portion to length the animal leash.

In accordance with another illustrative aspect of the invention, a yoke assembly may be configured to be removably coupled to the attachment portion. The yoke assembly may include a transverse crosspiece having first and second ends. Attachment portions may be coupled at or near the ends of the transverse crosspiece and configured to be removably attached to the collar or harness on multiple animals.

Further features and advantages, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of some embodiments of the invention, as illustrated in the accompanying drawings. Unless otherwise indicated, the accompanying drawing figures are not to scale. Several embodiments of the invention will be described with respect to the following drawings, in which like reference numerals represent like features throughout the figures, and in which.

DETAILED DESCRIPTION

Some embodiments of the invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the invention.

Figure 1:
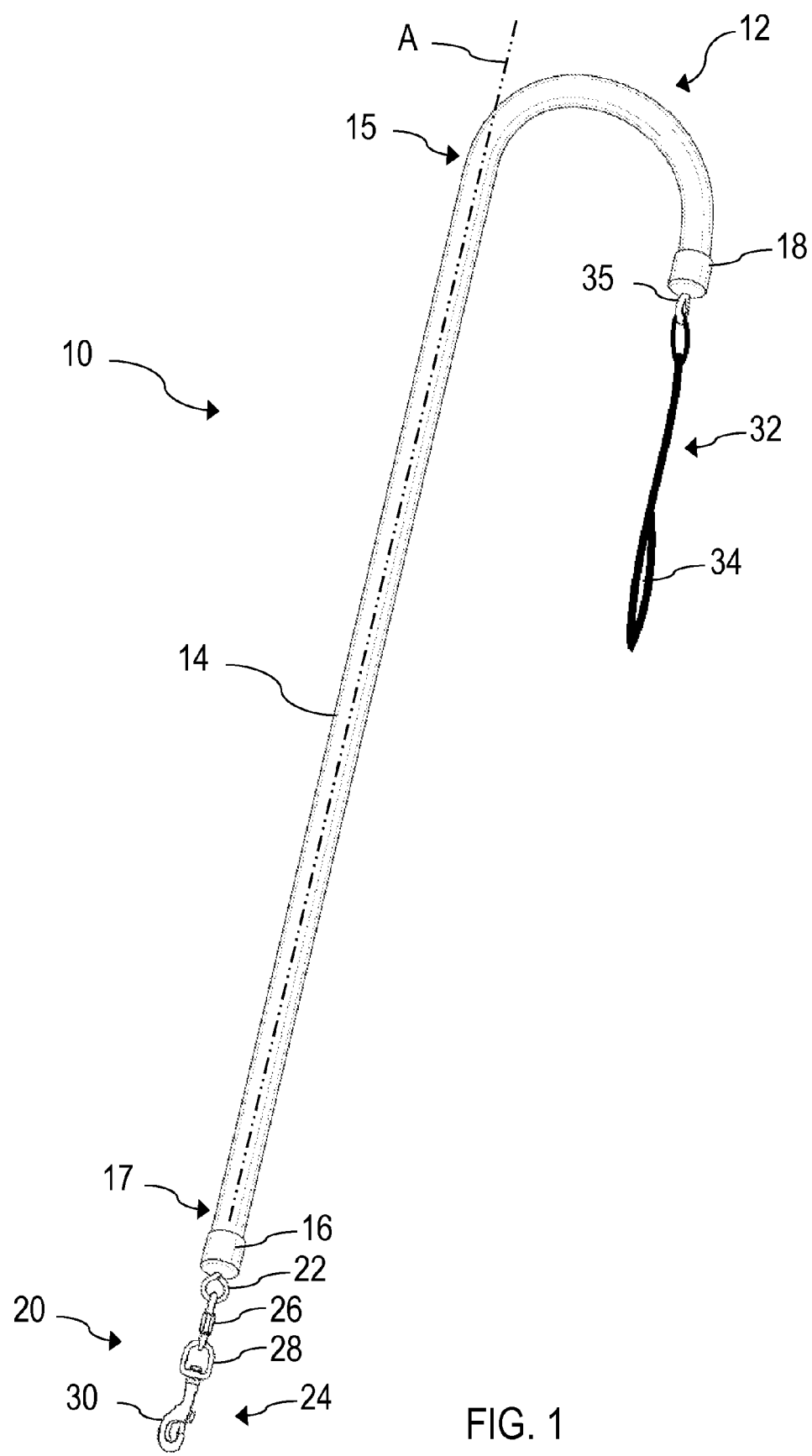
FIG. 1 is a perspective view of an animal leash according to an embodiment of the invention.

FIG. 1 is a perspective view of an animal leash 10 according to an embodiment of the invention. As shown in FIG. 1, the animal leash 10 includes a rigid handle portion 12, a rigid rod 14, and an animal attachment portion 20. The rigid rod 14 extends along a longitudinal axis A and includes a proximal end 15 and a distal end 17. The handle portion 12 may be rigidly connected to the proximal end 15 of the rigid rod 14 and configured to be gripped or held by a hand of the user. One or both of the handle portion 12 and the rigid rod 14 may be formed from a suitable material having a relatively high strength-to-weight ratio such as, for example, a plastic, a metal, or a composite material including, for example, polyvinylchloride (PVC) or aluminum. According to an embodiment, an overall length of the rigid rod 14 and handle portion 12 as measured along axis A may be between approximately 20 inches and 60 inches. According to an embodiment, an overall length of the rigid rod 14 and handle portion 12 as measured along axis A may be between approximately 40 inches and 55 inches. In some embodiments, such as for example but not limited to, use of leash 10 as a special law enforcement/military K9 training device, or for special needs dogs (e.g., seeing eye dogs), the length of the rigid rod 14 and handle portion 12 as measured along axis A may be approximately 20 inches. The length of the animal leash 10 may be fixed or adjustable, for example, as set forth in further detail below.

The handle portion 12 and the rigid rod 14 may be integrally formed, for example as shown in FIG. 1, by bending the proximal end 15 of the rigid rod 14 at an angle relative to the longitudinal axis A. Alternatively, the handle portion 12 and the rigid rod 14 may be separately manufactured and rigidly coupled together by known mechanical connections including, for example, welding, adhesives, fasteners, brackets, gussets, friction fit, snap fit, a threaded connection, and the like. The handle portion 12 may be formed having a radius of curvature as shown in FIG. 1 or the handle portion 12 may be a substantially straight or slightly curved portion relative to the longitudinal axis A. The rigid connection between the handle portion 12 and the rigid rod 14 may be substantially stiff and unyielding so that the handle portion 12 and the rigid rod 14 are firmly fixed or set relative to one another.

As shown in FIG. 1, an end cap 16 may be coupled to the distal end 17 of the rigid rod 12. Another end cap 18 may be coupled to an end of the handle portion 12. The end caps 16, 18 may be permanently or removably attached to the rigid rod 12 and handle portion 12 by, for example, welding, adhesives, fasteners, brackets, gussets, friction fit, snap fit, a threaded connection, and the like. The end caps 16, 18 may be formed from a suitable material having a relatively high strength-to-weight ratio such as, for example, a plastic or a metal such as, for example but not limited to, polyvinylchloride (PVC) or aluminum or a composite material.

The animal leash 10 may include an attachment portion 20 connected to the distal end 17 of the rigid rod 14. The attachment portion 20 may be, for example, rotatably coupled to the end cap 16 or, alternatively, directly to the distal end 17 of the rigid rod 14. The attachment portion 20 may include a swivel connection element 22 rotatably connected to the end cap 16 as discussed in further detail below with reference to FIG. 2. Swivel connection element 22 may include, for example but not limited to, an eye bolt. An intermediate connector 26 may couple the swivel connection element 22 to a leash clip member 24. Alternatively, the leash clip member 24 may be directly coupled to the swivel connection element 22 without an intermediate member. The leash clip member 24 may be, for example, a traditional leash clip mechanism configured to be releasably attached to a collar or harness of an animal (e.g., a dog). End cap 18 on handle portion 12 may also include a swivel connection element 35 rotatably connected to the end cap 18 which is the same as or similar to swivel connection element 22. A tether device 32 in the form of, for example, a flexible fabric, rope, or cable element may be attached to swivel connection element 35 and may include a looped end 34 for being received over the hand and wrist of a user as a safety mechanism in the event the user loses his or her grip on handle portion 12.

As shown in the illustrated embodiment of FIG. 1, animal leash 10 may include a continuous rigid portion that extends between an animal and a user. The rigid portion, as shown, may extend continuously from the distal end 17 (animal end) along rod 14 and handle portion 12 to be gripped by the user. The continuous rigid portion may provide a stiff and/or unyielding extension between the animal and the user, such that the user has three-dimensional control over the animal as discussed in further detail herein. In the embodiment depicted in FIG. 1, both the handle portion 12 and the rod 14 are rigid along the entire length thereof. As shown in FIG. 1, handle portion 12 may extend at an angle relative to the longitudinal axis A of rod 14 so as to provide the user with added control. As such, the user may control the animal by movement of handle portion 12 in various directions, as discussed in further detail herein, which movement is translated through rod 14 to the distal end 17 thereof and, ultimately to the animal connected to the attachment portion 20. Animal leash 10 of FIG. 1 shows a continuously rigid portion, including rod 14 and handle portion 12, and which has substantially the same rigidity or stiffness along the entire length. In alternative embodiments, animal leash 10 may have varying degrees of rigidity along the length thereof in accordance with principles of the invention.

Figure 1A:
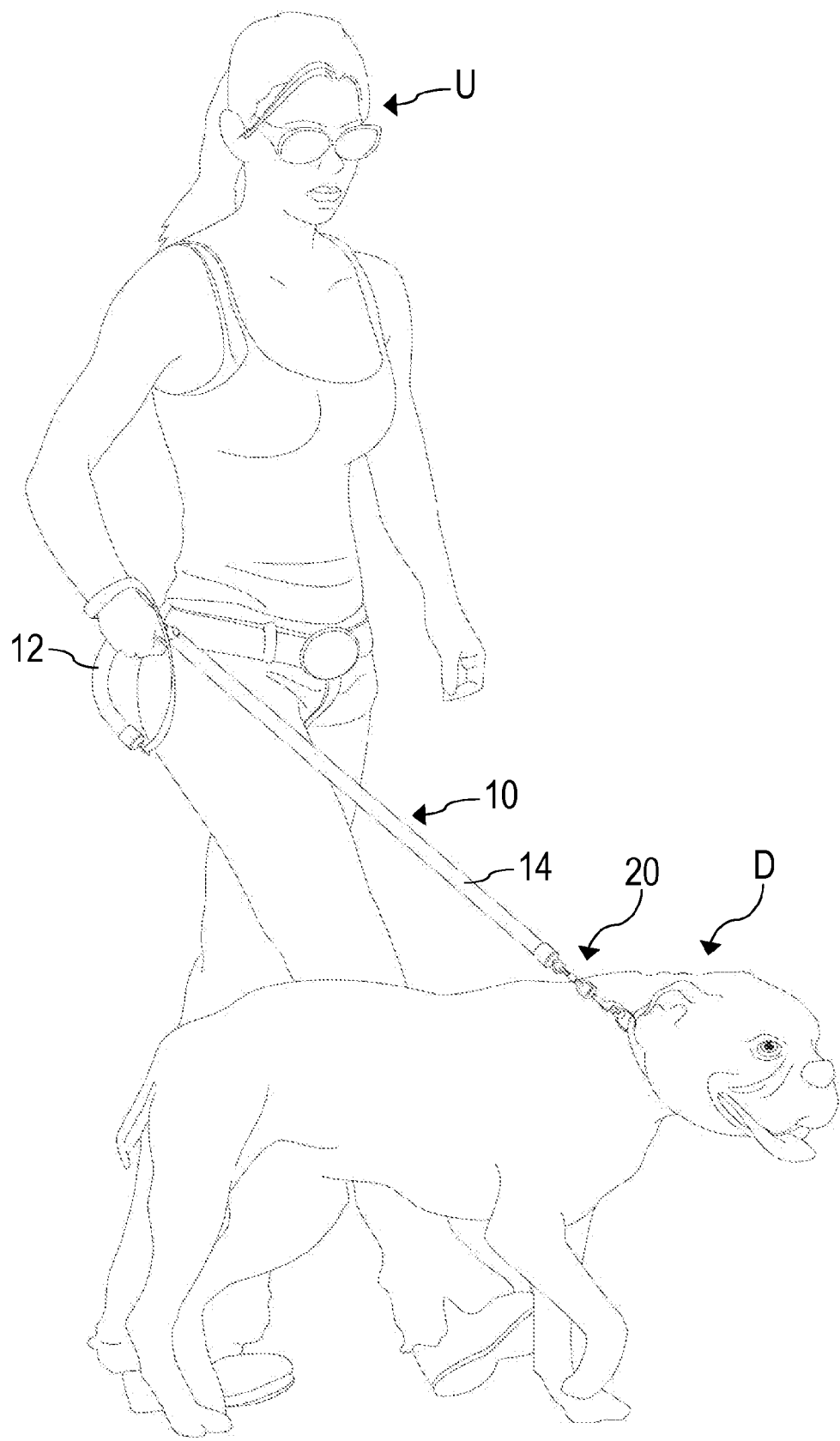
FIG. 1A is an illustrative perspective view of the animal leash of FIG. 1 in use.

FIG. 1A depicts an illustrative perspective view of the animal leash 10 of FIG. 1 in use. A user U grips the handle portion 12 with his or her hand. The attachment portion 20 is shown attached to the collar of dog D. The rigid rod 14 extends between the handle portion 12 and the attachment portion 20. The animal leash 10 may provide the user U with three-dimensional control of dog D while walking and/or training dog D. For example, the rigidity of the handle portion 12, the rigid rod 14, and the rigid connection therebetween, enables the user U to substantially control movement of the dog D toward and away from the user U, side-to-side, as well as up-and-down. In this way, animal leash 10 can, for example, be used as a training device to teach puppies and/or full grown dogs not to jump or misbehave during walking and/or training. If, for example, the dog D attempts to jump up on user U or on a bystander, user U can easily prevent such movement due to the stiffness of the handle portion 12, the rigid rod 14, and the rigid connection therebetween. As shown in FIGS. 1 and 1A, for example, rigid handle portion 12 of the animal leash 10 may be curved and rigid rod 14 may be substantially straight, whereby the user, gripping handle portion 12, is provided with control over the distal end 17 of the rod 14 and, hence, the dog D.

Figure 2:
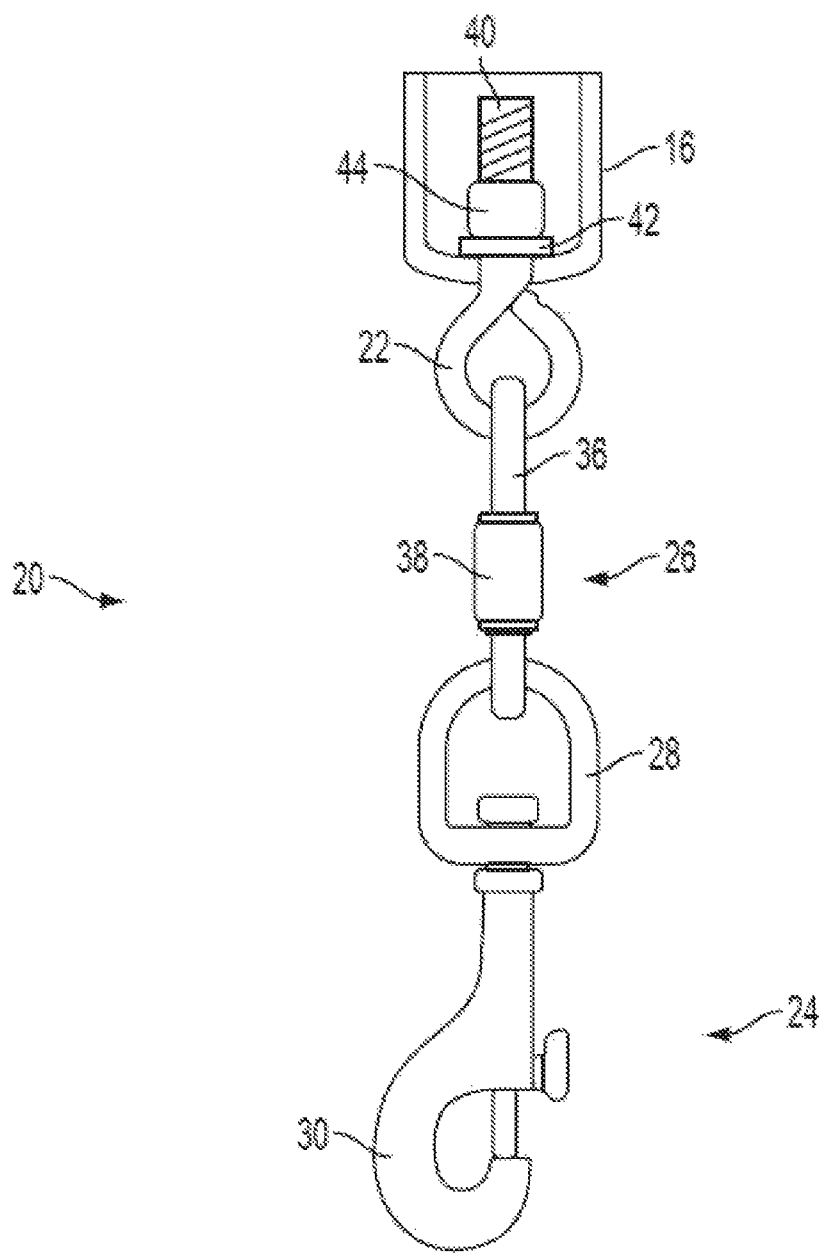
FIG. 2 is an isolated front view of an attachment portion of the animal leash depicted in FIG. 1.
Figure 3:
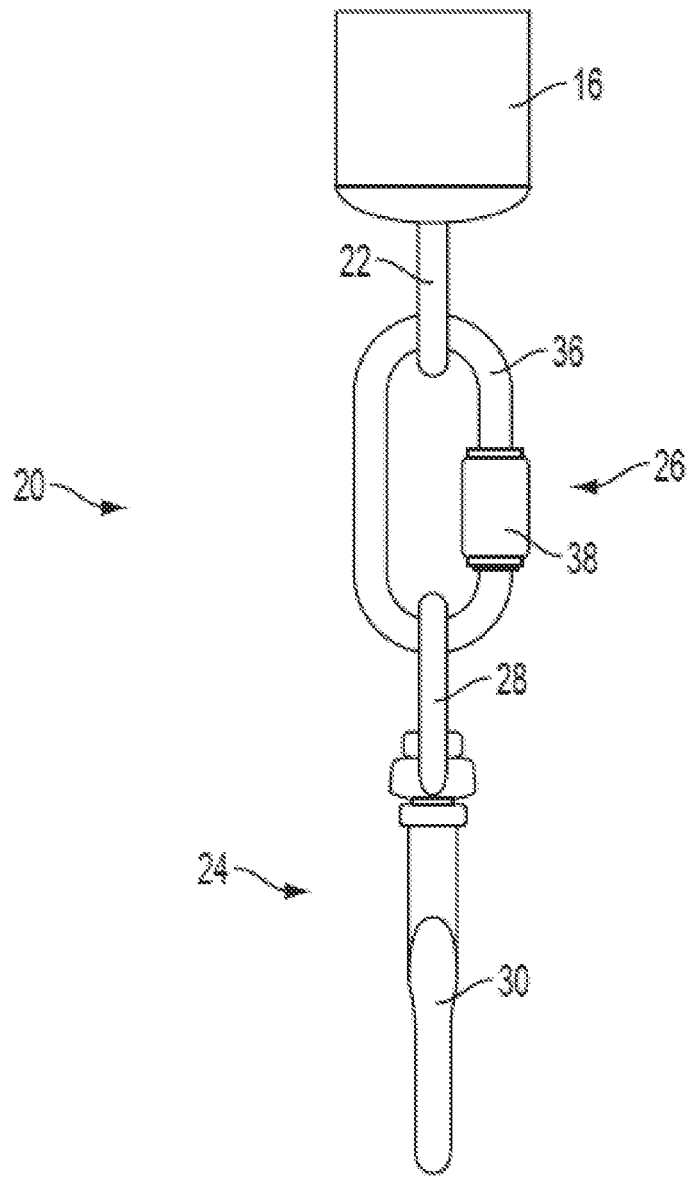
FIG. 3 is a an isolated side view of the attachment portion of the animal leash depicted in FIG. 1.

FIG. 2 is an isolated front view of the attachment portion 20 of the animal leash 10 depicted in FIG. 1. FIG. 3 is an isolated side view of the attachment portion 20 of the animal leash 10 depicted in FIG. 1. Attachment portion 20 may include swivel connection element 22, intermediate connector 26, and leash clip member 24. The swivel connection element 22 in FIGS. 2 and 3 is rotatably coupled to end cap 16. End cap 16 is shown in cross-section to allow viewing of attachment of swivel connection element 22. The swivel connection element 22 is depicted in this embodiment as an eye bolt but one of ordinary skill will recognize that any connection or fastener allowing rotation will suffice. Eye bolt 22 may include a threaded end 40 extending through a central hole in end cap 16. A washer 42 and a locking nut 44 (e.g., a nylon locking nut) may be coupled to the threaded end 40 of the eye bolt 22 to allow the eye bolt 22 to rotate within end cap 16. Intermediate connector 26 may include a ring portion 36 moveably coupled to the eye bolt 22 and a connection portion 28 of leash clip member 24. Intermediate connector 26 may also include a threaded sleeve 38 arranged to selectively close a gap in ring portion 36. The leash clip member 24 connection portion 28 may be rotatably coupled to latch body portion 30. Latch body portion 30 may include a spring-biased detent for releaseably coupling the leash clip member to a collar or harness of the animal as will be apparent to those of ordinary skill in the art.

Figure 4:
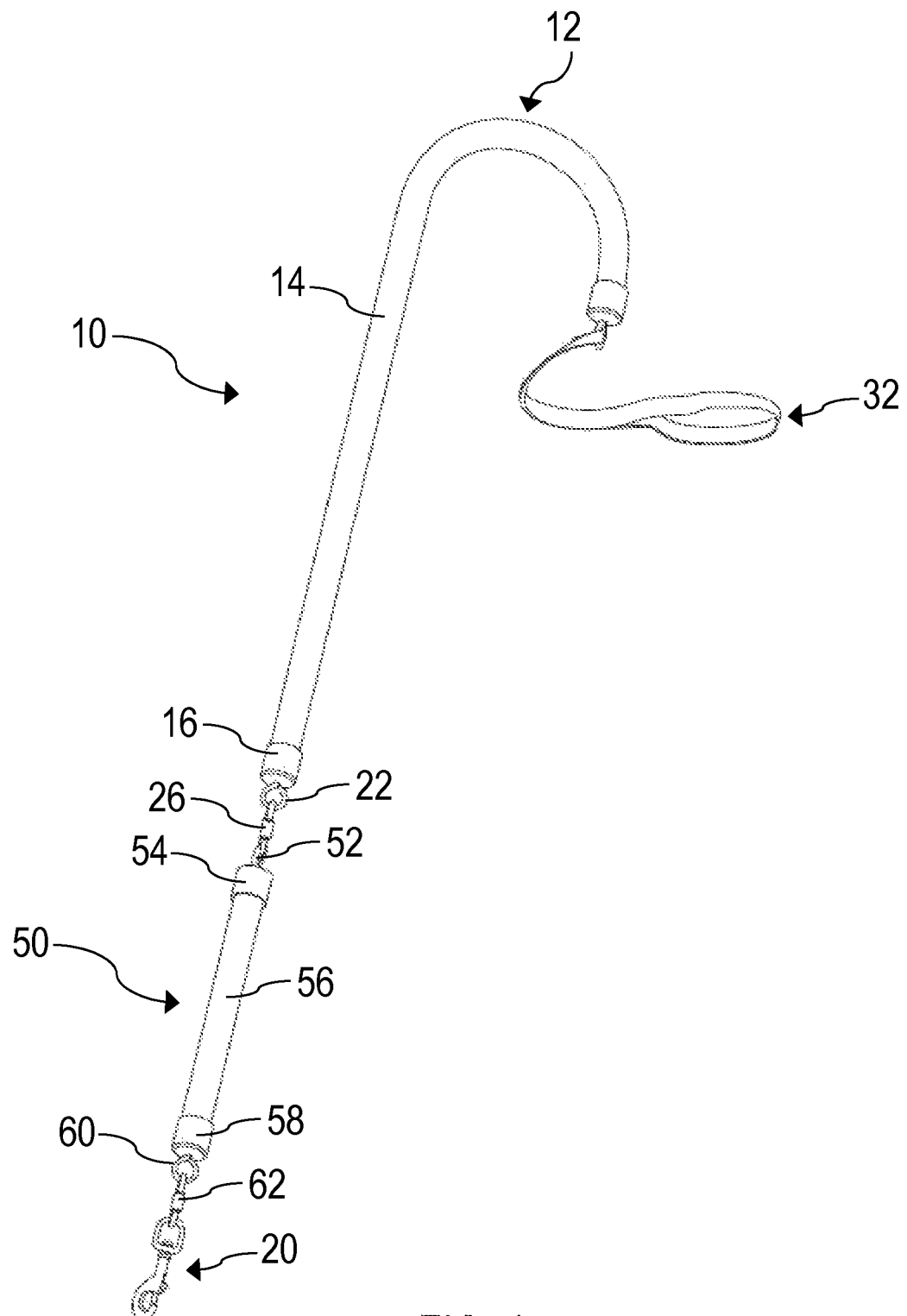
FIG. 4 is a perspective view of the animal leash of FIG. 1 including an extension assembly according to another embodiment of the invention.

FIG. 4 is a perspective view of the animal leash 10 of FIG. 1 including an extension assembly 50 according to another embodiment of the invention. As shown in FIG. 4, the animal leash 10 of FIG. 1 may include an extension assembly 50 to selectively extend the length of the leash 10 and/or to provide some additional range of motion at the distal end of the leash 10. The distal end 17 of the rigid rod 14 may include end cap 16, swivel connection element 22, and intermediate connector 26. The extension assembly 50 may include a swivel connection element 52 connected to the intermediate connector 26 and to another end cap 54 at one end of rigid extension body 56. At the other end of rigid extension body 56 another end cap 58 may be provided. The rigid extension body 56 may be formed from a suitable material having a relatively high strength-to-weight ratio such as, for example, a plastic, a metal, or a composite material including, for example, polyvinylchloride (PVC) or aluminum. Rotatably coupled to end cap 58 is attachment portion 20, including swivel connection element 60, intermediate connector 62, and a leash clip member 24 as substantially described above with reference to FIGS. 2 and 3.

Figure 5:
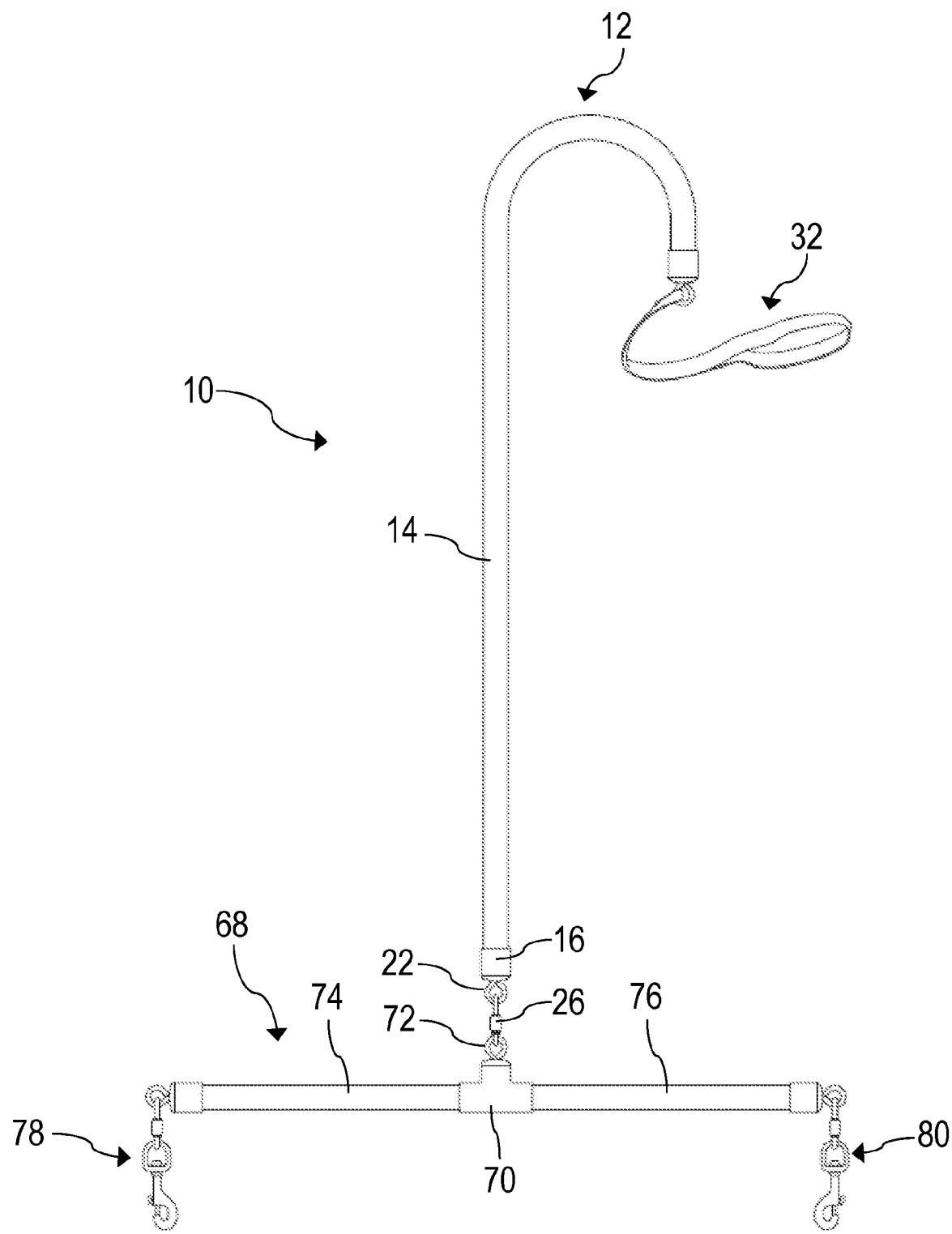
FIG. 5 is a perspective view of the animal leash of FIG. 1 including an attachment assembly to allow control of multiple animals according to another embodiment of the invention.

FIG. 5 is a perspective view of the animal leash 10 of FIG. 1 including an attachment assembly 68 to allow control of multiple animals according to another embodiment of the invention. FIG. 5 shows the distal end 17 of rigid rod 14 including end cap 16. Swivel connection element 22 is rotatably coupled to end cap 16. Intermediate connector 26 couples the swivel connection element 22 to another swivel connection element 72 rotatably coupled to a T-connector 70 of the attachment assembly 68. Branching off in opposite directions from the T-connector 70 are rigid bodies 74, 76, which may be, for example, rods or tubes. One or both of the T-connector 70 and the rigid bodies 74, 76 may be formed from a suitable material having a relatively high strength-to-weight ratio such as, for example, a plastic, a metal, or a composite material including, for example, polyvinylchloride (PVC) or aluminum. Attachment portions 78, 80, each of which may be constructed substantially similar to attachment portion 20 described above, are connected at the outer ends of the rigid bodies 74, 76, respectively, for releasable attachment to multiple animals. In this way, a user U may use animal leash 10, for example, to walk and/or train multiple dogs.

Figure 6:
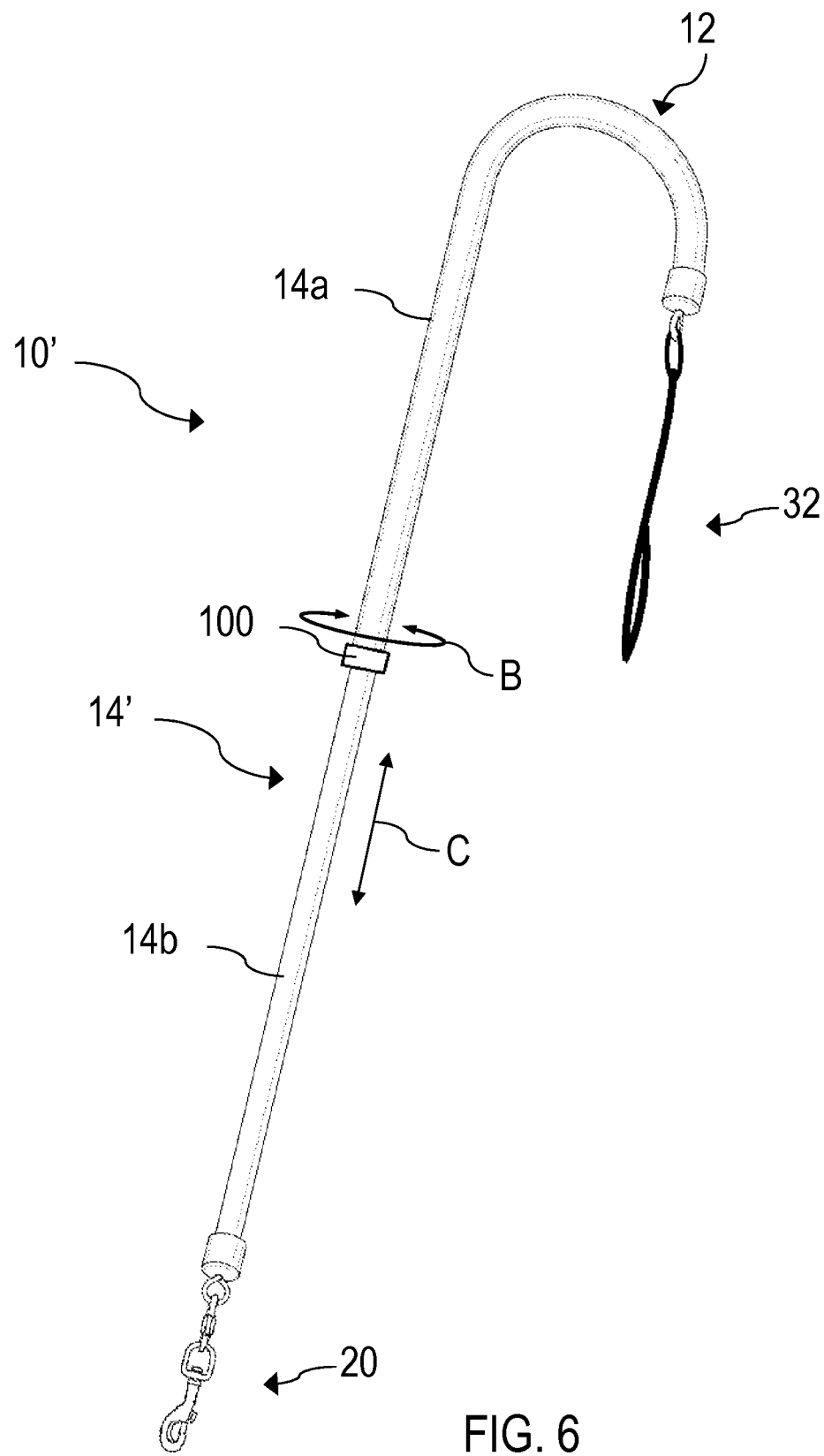
FIG. 6 is a perspective view of an animal leash having an extendible rigid body portion according to another embodiment of the invention.

FIG. 6 is a perspective view of an animal leash 10' having an extendible rigid body portion 14' according to another embodiment of the invention. Animal leash 10' is substantially the same as animal leash 10 described above with reference to FIG. 1 except that body portion 14' is constructed as a telescoping tubular structure in which a first portion 14a and a second portion 14b are arranged to telescope with respect to one another in either direction as shown by arrow C. A locking mechanism 100 may be provided and may include, for example, a rotatable friction lock which can be rotated by user U in either direction as shown by arrow B to selectively lock and unlock portions 14a, 14b with respect to one another. This may allow the user U to adjust the overall length of the animal leash 10' based on individual preferences and the needs of the animal.

The animal leash may be used to teach and or prohibit puppies as well as full grown dogs from certain behavior. Animal leash may make walking a dog much more enjoyable and easy due to added control in three-dimensions while still providing ample freedom of movement when desired. For example, the animal leash may help the user better prevent the dog from jumping or grabbing the leash out of the user's hands, which may aid in training the dog. Furthermore, the rigid nature of the animal leash prevents tangling within the user's legs or within the dogs's legs. Additionally, the rigid nature of the leash may be used in self-defense to provide added protection for the user and his or her dog if necessary. Although not shown, the animal leash can also be adapted to carry additional safety devices such as, for example but not limited to, a flashlight, cell phone, etc.

Figure 7:
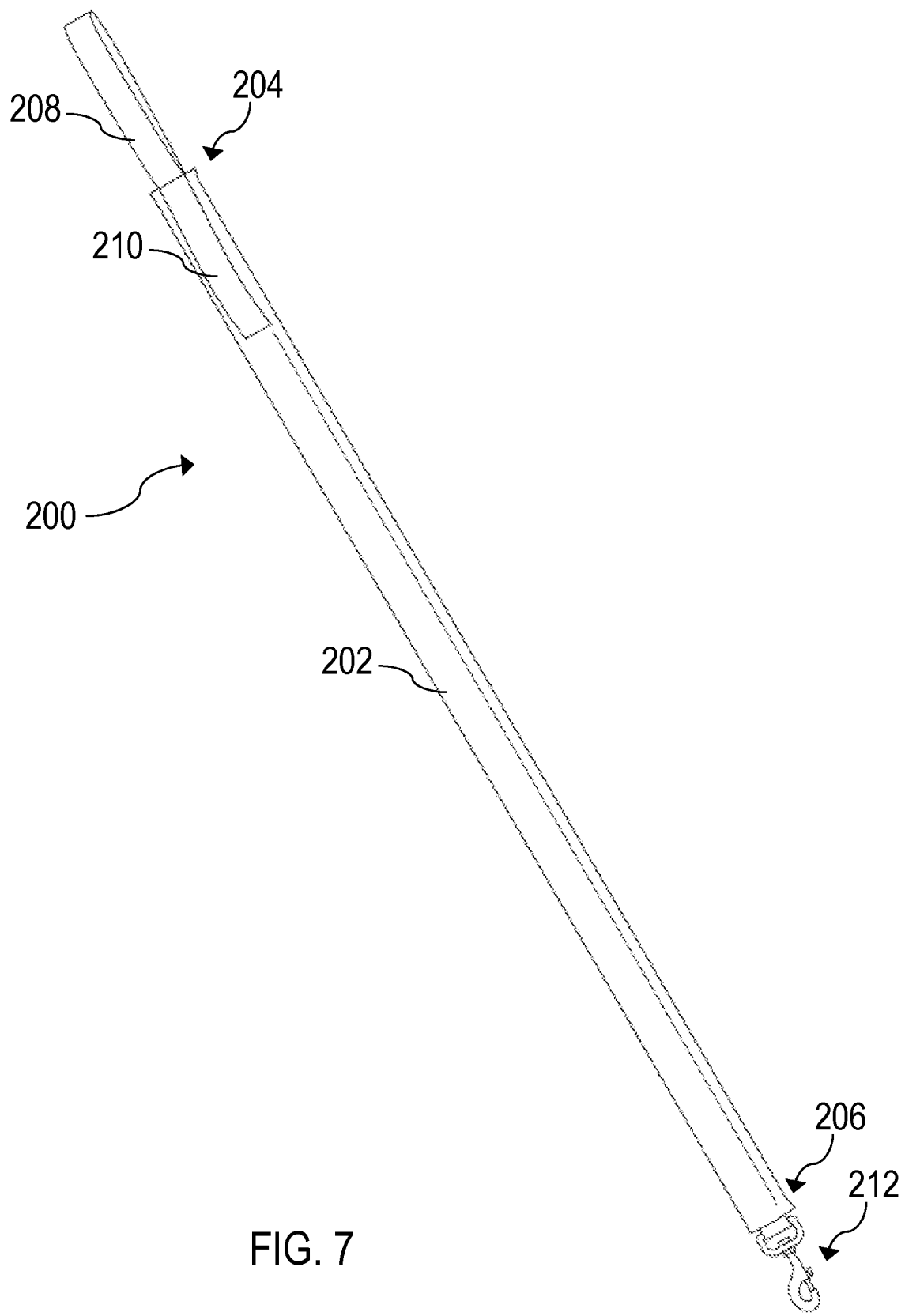
FIG. 7 is a perspective view of an animal leash according to another embodiment of the invention.

FIG. 7 is a perspective view of an animal leash 200 according to another embodiment of the invention. The animal leash 200 may provide a user with the ability to optionally have three-dimensional control over an animal when walking and/or training the animal. In some cases, it may be beneficial for a user to have the option of utilizing the animal leash 200 as a traditional, flexible leash. The animal leash 200 includes features to optionally transition between a rigid and flexible leash as needed depending on user and animal preferences. For example, the user may not require three-dimensional control when simply taking the animal to the vet or keeping the animal close in other situations. Furthermore, some dogs may be initially frightened of the appearance of a rigid device and may require time to transition to the use of a rigid device.

Figure 8:
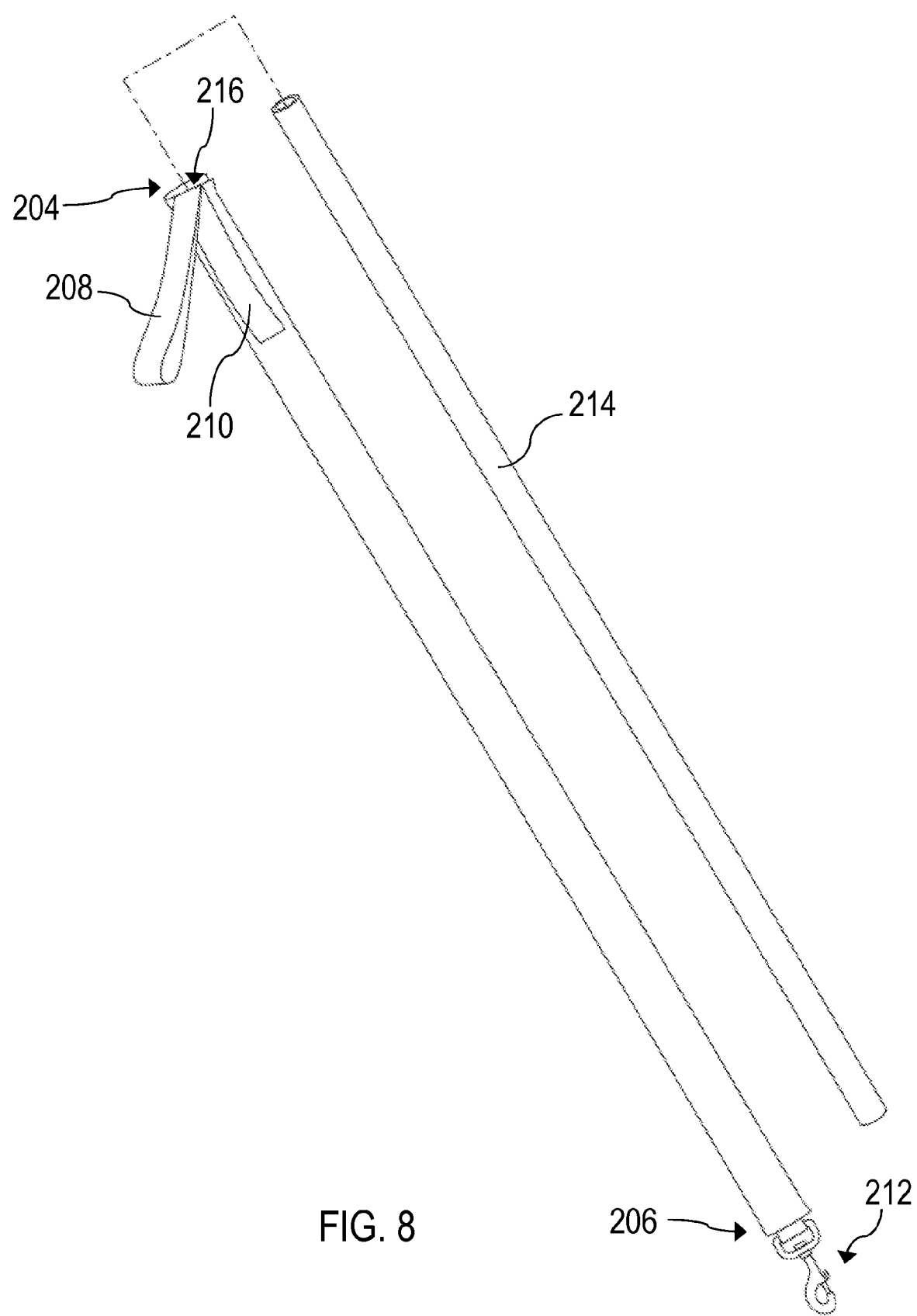
FIG. 8 is an exploded perspective view of the animal leash of FIG. 7 showing an insertable rigid rod and an elongated flexible sleeve.

As shown in FIG. 7, the animal leash 200 may include an elongated flexible sleeve 202 having a proximal end 204 and a distal end 206. FIG. 8 is an exploded perspective view of the animal leash 200 of FIG. 7 showing a rigid rod 214 optionally insertable within the elongated flexible sleeve 202. A wrist strap 208 may be connected at or near the proximal end 204 of the sleeve and may be configured to be worn around a wrist of the user U (see FIGS. 10-11) during use. A hand covering strip 210 may also be connected at or near the proximal end 204 of the sleeve 202 to extend around the hand of the user U during use. The sleeve 202 may be formed from a woven material such as, for example, but not limited to tubular webbing or a 4 in. wide strip of webbing folded in half and stitched at the open edge. The webbing may be, for example, but not limited to, nylon, rayon, acrylic, cotton, a blend or the like. Other natural and artificial fibers may be possible. The wrist strap 208 and hand covering strip 210 may be formed from a woven material such as, for example, but not limited to nylon webbing, rayon webbing, acrylic fabric, cotton, a blend or the like. Other natural and artificial fibers may be possible. An attachment portion 212 may be coupled at or near the distal end 206 of the sleeve 202 and may be configured to be releasably attached to a collar or harness on an animal. The attachment portion 212 may include any known leash attachment mechanism such as, for example, the leash clip member 24 as substantially described above with reference to FIG. 2. At least a portion of the attachment portion 212 may be configured to swivel relative to the sleeve 202 to prevent twisting and tangling of the device during use.

Figure 9:
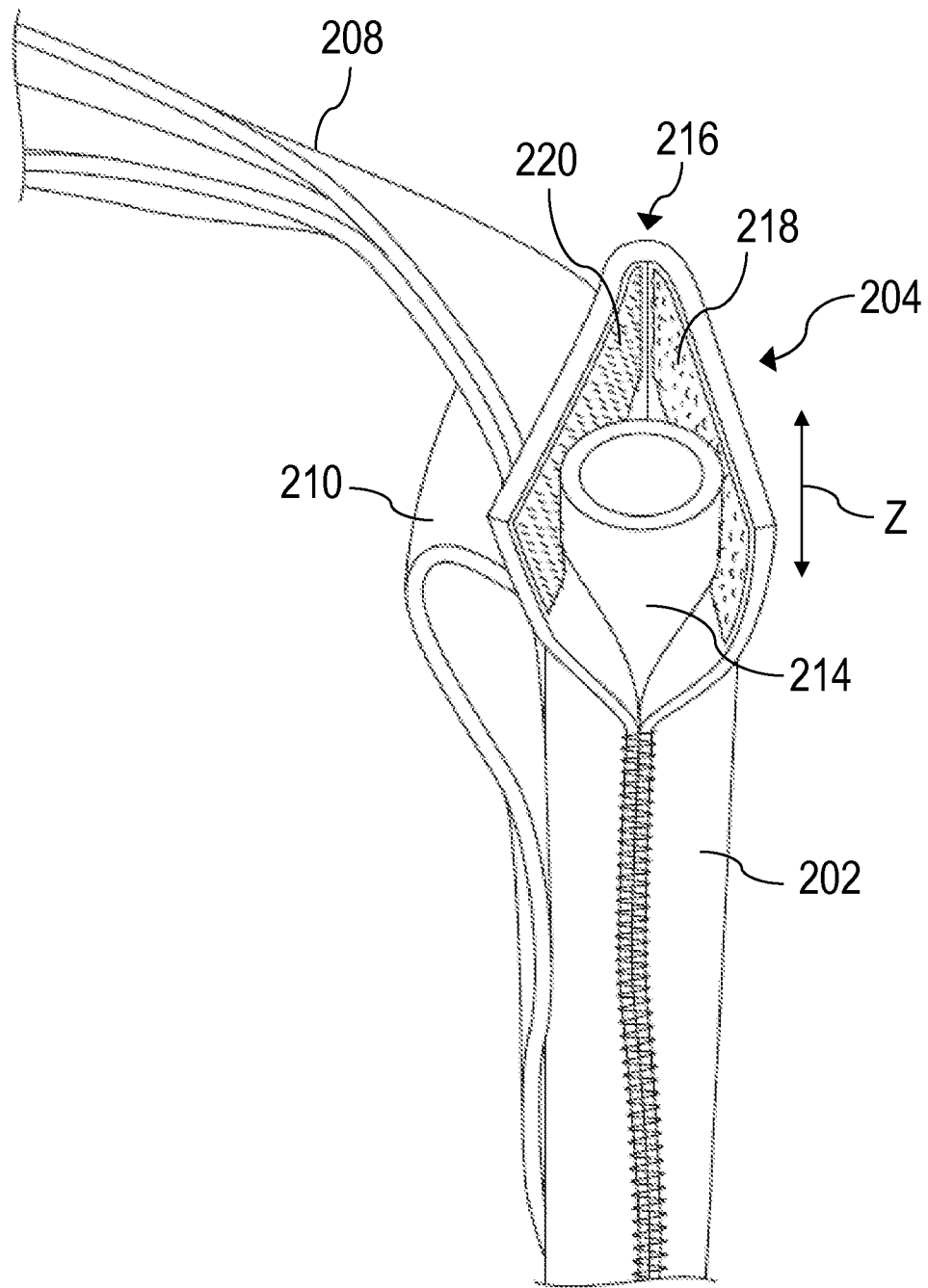
FIG. 9 is an enlarged partial view of the animal leash depicted in FIGS. 7 and 8 showing the insertable rigid rod inserted within the elongated flexible sleeve.

As shown in FIG. 8, the sleeve 202 may include an opening 216 at the proximal end 204 for accessing a pocket extending along the interior of the sleeve 202. The rigid rod 214 may be removably received within the interior pocket of the sleeve 202 through the opening 216. FIG. 9 is an enlarged partial view of the animal leash 200 depicted in FIGS. 7 and 8 showing the rigid rod 214 inserted within the elongated flexible sleeve 202. As shown in FIG. 9, the rigid rod 214 may be inserted and removed from within the interior pocket of the sleeve 202 along direction Z via opening 216. Opening 216 at the proximal end 204 of the sleeve 202 may be optionally closable via a closing element 218, 220. As shown in the embodiment depicted in FIG. 9, closing element 218, 220 may include a hook-and-loop type fastening element but could also include any other suitable reversible closure mechanism known to those having ordinary skill in the art such as, for example but not limited to, a hook-and-loop fastening element, a snap element, a button element, a zipper element, a magnetic element, an adhesive element, or the like.

The rigid rod 214 is continuously rigid along the length thereof and may be formed from, for example, lightweight rigid material such as, for example, plastic, metal, or a composite. The rigid rod 214 may be solid or hollow and may be substantially cylindrical, as shown in FIGS. 8 and 9, but the device is not limited to this and the rod 214 may have any suitable cross-sectional shape. In some embodiments, for example, the rigid rod 214 may be formed from plastic tubing such as, for example but not limited to polyvinylchloride (PVC), including ½" or ¾" PVC schedule 40 pipe. Alternatively, the rigid rod 214 could be formed from a strong, lightweight metal material such as, for example but not limited to, extruded aluminum tubing.

Figure 10:
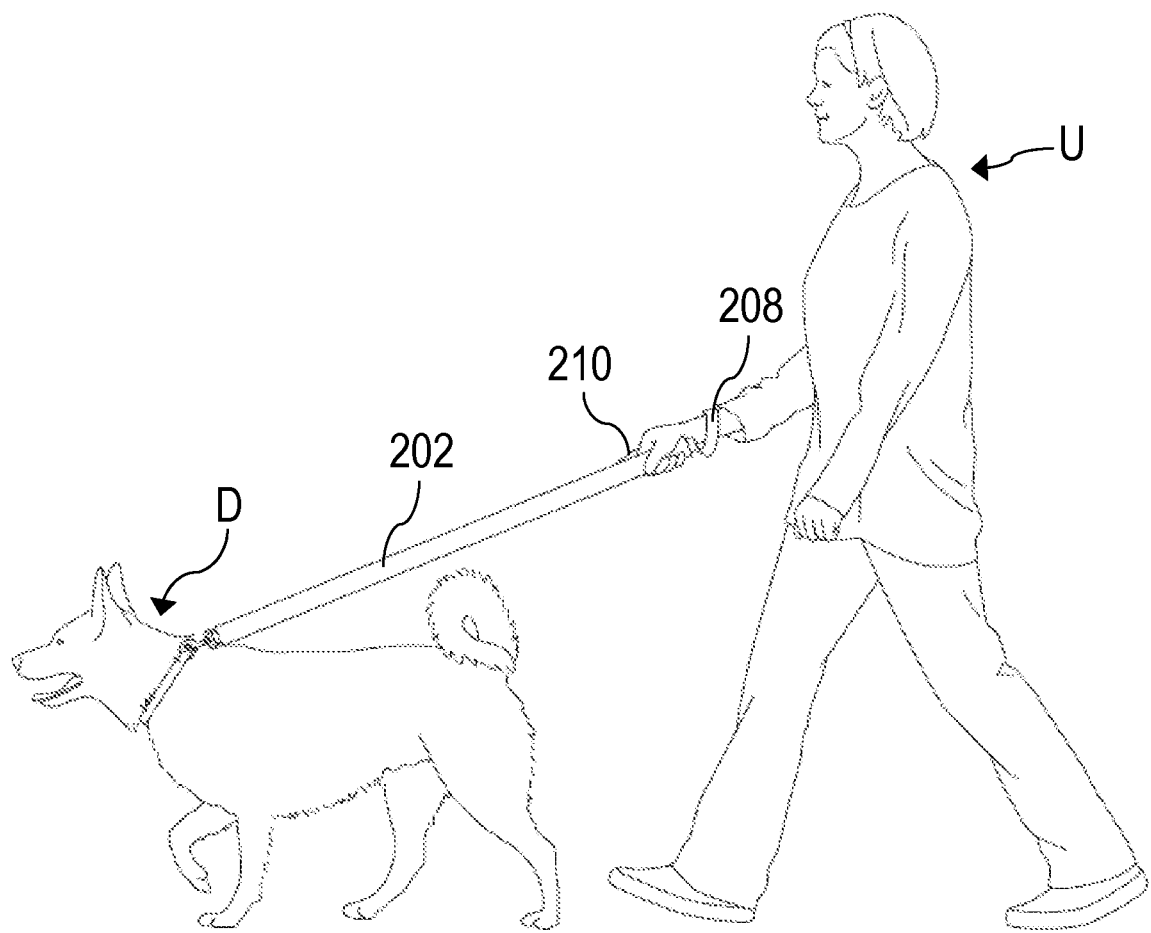
FIG. 10 is an illustrative view of the animal leash depicted in FIG. 7 in use in an optionally rigid configuration.
Figure 11:
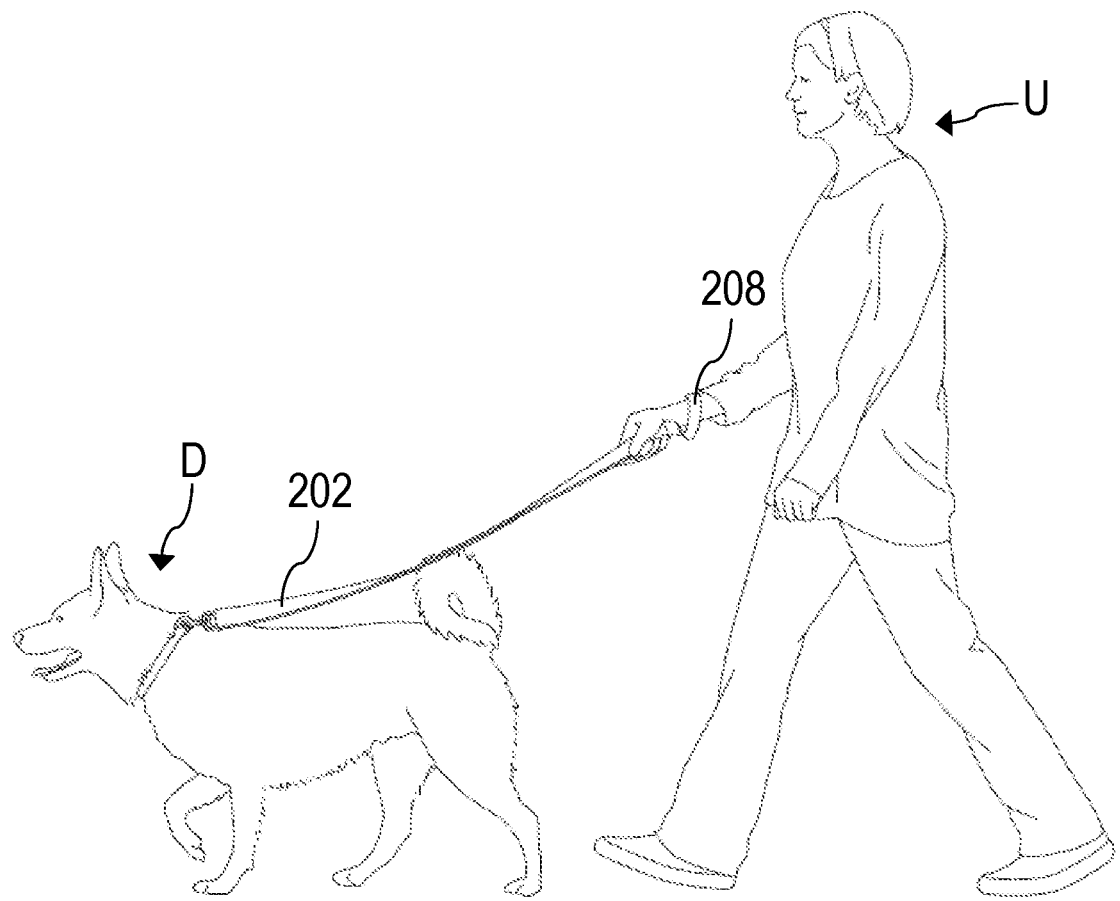
FIG. 11 is an illustrative view of the animal leash depicted in FIG. 7 in use in an optionally flexible configuration.

FIG. 10 is an illustrative view of the animal leash 200 in use in the optionally rigid configuration according to an embodiment. FIG. 11, on the other hand, is an illustrative view of the animal leash 200 in use in the optionally flexible configuration according to an embodiment. In FIG. 10, the user U is shown gripping the proximal end 204 of the sleeve 202, with his or her hand, proximate the hand covering strip 210. The user's hand extends through the wrist strap 208 and grips an end of the rigid rod 214 disposed within the interior pocket of the sleeve 202. The attachment portion 212 is shown attached to the collar of dog D. The animal leash 200 thus provides the user U with three-dimensional control of dog D while walking and/or training dog D. The rigidity of the rigid rod 214 enables the user U to substantially control movement of the dog D toward and away from the user U, side-to-side, as well as up-and-down. In this way, animal leash 200 can, for example, be used as a training device to teach puppies and/or full grown dogs not to jump or misbehave during walking and/or training. If, for example, the dog D attempts to jump up on user U or on a bystander, user U can easily prevent such movement due to the rigid connection between the hand of the user U and the dog D.

In FIG. 11, the user U is shown gripping the proximal end 204 of the sleeve 202, with his or her hand, proximate the hand covering strip 210. As before, the user's hand may extend through the wrist strap 208 but, in this case, the rigid rod 214 has been removed from within the interior pocket of the sleeve to provide a flexible configuration. The rigid rod 214 can be removed from sleeve 202, for example, when the user U deems that the dog is no longer exhibiting behaviors warranting a rigid device and/or that training is complete to the user's satisfaction. The attachment portion 212 is shown attached to the collar of dog D. The animal leash 200 thus provides the user U with a traditional flexible leash. At any time, the rigid rod 214 may be inserted within the sleeve 202 to transition to the rigid configuration as desired.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. An animal leash, comprising:
   an elongated flexible sleeve having a proximal end and a distal end, wherein the proximal end is configured to be held by a hand of a user and includes an opening for accessing an interior pocket of the sleeve;
   a rigid rod configured to be removably received within the interior pocket of the sleeve through the opening; and
   an attachment portion coupled to the distal end of the sleeve and configured to be releasably attached to a collar or harness on an animal,
   wherein the opening of the sleeve is selectively closable by the user, and wherein the opening of the sleeve comprises a closing element from a group consisting of: a hook-and-loop fastening element, a snap element, a button element, a zipper element, a magnetic element, and an adhesive element.

2. The animal leash according to claim 1, wherein the elongated flexible sleeve comprises a woven material.

3. The animal leash according to claim 1, wherein the attachment portion includes a leash clip member.

4. The animal leash according to claim 1, wherein at least a portion of the attachment portion is configured to swivel relative to the sleeve.

5. The animal leash according to claim 1, wherein the rigid rod is continuously rigid along a length thereof.

6. The animal leash according to claim 1, wherein the rigid rod comprises a plastic or metal tube.

7. The animal leash according to claim 1, wherein the rigid rod comprises a plastic tube, the plastic tube comprising polyvinylchloride (PVC).

8. The animal leash according to claim 1, wherein the rigid rod comprises a metal tube, the metal tube comprising aluminum.

9. The animal leash according to claim 1, further comprising a safety tether connected at or near the proximal end of the sleeve and configured to be worn around a wrist of the user during use.

10. The animal leash according to claim 1, further comprising a hand covering strip connected at or near the proximal end of the sleeve and configured to extend around the hand of the user during use.

11. The animal leash according to claim 1, wherein, when removably received within the interior pocket of the sleeve, the rigid rod is surrounded by the sleeve over an entire length of the rigid rod.

12. The animal leash according to claim 1, wherein, when the proximal end of the sleeve is held by the hand of the user while the rigid rod removably received within the interior pocket of the sleeve, the rigid rod is configured to be gripped by the hand of the user with a portion of the sleeve disposed between the hand and the rigid rod.

13. The animal leash according to claim 2, wherein the woven material comprises nylon webbing.

\* \* \* \* \*